(12) United States Patent
Toft et al.

(10) Patent No.: US 12,144,026 B2
(45) Date of Patent: Nov. 12, 2024

(54) CHANNEL ACCESS PROCEDURE

(71) Applicant: Nokia Technologies Oy, Espoo (FI)

(72) Inventors: Morten Toft, Svenstrup (DK); Claudio Rosa, Randers NV (DK); Mika Kasslin, Espoo (FI); Olli Alanen, Vantaa (FI); Roberto Maldonado, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/015,199

(22) PCT Filed: May 6, 2021

(86) PCT No.: PCT/EP2021/062015
§ 371 (c)(1),
(2) Date: Jan. 9, 2023

(87) PCT Pub. No.: WO2022/008120
PCT Pub. Date: Jan. 13, 2022

(65) Prior Publication Data
US 2023/0199835 A1    Jun. 22, 2023

(30) Foreign Application Priority Data
Jul. 10, 2020   (FI) ...................................... 20205746

(51) Int. Cl.
*H04W 74/0808*    (2024.01)
(52) U.S. Cl.
CPC .............. *H04W 74/0808* (2013.01)

(58) Field of Classification Search
CPC .......... H04W 74/0808; H04W 74/0825; H04L 5/0048
See application file for complete search history.

(56) References Cited

U.S. PATENT DOCUMENTS

| | | |
|---|---|---|
| 7,916,650 B2 | 3/2011 | Kim et al. |
| 9,912,438 B2 | 3/2018 | Yerramalli et al. |
| 10,257,856 B2 | 4/2019 | Park et al. |
| 2017/0041951 A1* | 2/2017 | Yin ........................ H04W 74/08 |

(Continued)

FOREIGN PATENT DOCUMENTS

| | | |
|---|---|---|
| EP | 3 410 803 A1 | 12/2018 |
| WO | WO 2015/200090 A1 | 12/2015 |

(Continued)

OTHER PUBLICATIONS

PCT ISR-WO, Aug. 23, 2021, 16 pages.

(Continued)

*Primary Examiner* — Siren Wei
(74) *Attorney, Agent, or Firm* — Lippes Mathias LLP (57) ABSTRACT

A transmitter is configured to set a counter to a starting value, sense whether a channel is busy or idle and to update the counter value during sensing. When there is data to be transmitted, the transmitter is configured to determine, based on at least the counter value at a transmit opportunity and a duration the channel has been sensed idle before the transmit opportunity, whether to transmit the data or to continue the sensing the channel to a next transmit opportunity without resetting the counter value to the starting value.

13 Claims, 7 Drawing Sheets

(56) References Cited

U.S. PATENT DOCUMENTS

2017/0126300 A1    5/2017  Park et al.
2018/0020485 A1*   1/2018  Yang ..................... H04L 1/1854
2018/0124611 A1    5/2018  Moon et al.
2019/0104547 A1*   4/2019  Xue ...................... H04L 5/0023

FOREIGN PATENT DOCUMENTS

WO    WO 2017/024036 A1    2/2017
WO    WO 2020/128142 A1    6/2020

OTHER PUBLICATIONS

Ericsson, "Details of Listen-Before-Talk for LAA", R1-145193, 3GPP TSG RAN WG1, Meeting #79, San Francisco, CA Nov. 17-Nov. 21, 2014, XP050895129 [retrieved on Nov. 17, 2014] 7 pages.

3GPP TS 37.213 V16.1.0 Technical Specification, Physical Layer Procedures for Shared Spectrum Channel Access (Release 16), (Mar. 2020) 26 pages.

Yang, et al. "Channel Access Scheme With Alignment Reference Interval Adaptation (ARIA) for Frequency Reuse in Unlicensed Band LTE: Fuzzy Q-Learning Approach", May 2, 2018, IEEE DOI: 10.1109/ACCESS.2018.2832448.

IEEE Std 802.11-2020 Extract, 10.3.4.3 Backoff procedure for DCF, 1673 @2021 IEEE.

IEEE Std 802.11-2020 Extract, Fig. 10-17 Backoff procedure, Part 11: Wireless LAN MAC and PHY Specifications.

* cited by examiner

CHANNEL ACCESS PROCEDURE

TECHNICAL FIELD

Various example embodiments relate to wireless communications and, particularly, to channel access procedure.

BACKGROUND

Wireless communication systems are under constant development. One way to meet the need for faster communication and huge increase of the data amount is to make use of unlicensed spectrum. Since different system that are not aware of each other may use the same frequency band, a channel access procedure is used to determine when to transmit on a channel to minimize the risk that the transmission interferes with other transmissions in the same frequency band.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

An aspect provides a transmitter comprising at least one processor and at least one memory including computer program code, the at least one memory and computer program code configured to, with the at least one processor, cause the transmitter at least to perform: sensing whether a channel is busy or idle; setting a counter to a starting value; updating the counter value during sensing; determining, in response to data to be transmitted, based on at least the counter value at a transmit opportunity and a duration the channel has been sensed idle before the transmit opportunity, whether to transmit the data or to continue the sensing the channel to a next transit opportunity without resetting the counter value to the starting value; and repeating the determining until the data is transmitted.

In an embodiment, the at least one memory and computer program code are configured to, with the at least one processor, cause the transmitter further to perform restarting the sensing and resetting the counter after transmitting the data.

In an embodiment, the at least one memory and computer program code are configured to, with the at least one processor, cause the transmitter further to perform: picking randomly a value to be used as the starting value in response to the channel being sensed idle a predetermined duration after starting the sensing; decreasing, as long as the counter value is bigger than a first preset limit, the counter value by one in response to the channel being sensed idle during a sensing duration; decreasing the counter value from the first preset limit to a second preset limit in response to both the data to be transmitted existing and a transmit opportunity existing after the sensing duration; and determining to transmit the data when the counter value is the second preset limit and the channel has been sensed idle a predetermined defer duration before the transmit opportunity.

In an embodiment, the first preset limit is one and the second preset limit is zero.

In an embodiment, the at least one memory and computer program code are configured to, with the at least one processor, cause the transmitter further to perform: in response to the channel being been sensed idle a predetermined defer duration after starting the sensing, setting the counter value to the starting value and a factor to a first value, which indicates that the channel has been sensed idle the predetermined defer duration; in response to the channel being sensed idle during a sensing duration while the factor has the first value, incrementing the counter value by one; in response to the channel being sensed busy during the sensing duration while the factor has the first value, setting the factor to a second value and resetting the factor to the first value in response to the channel being been sensed idle the predetermined defer duration after setting the factor to the second value; and in response to data to be transmitted and a transit opportunity existing, picking randomly a value and determining to transmit the data in response to the factor having the first value and the difference between the randomly picked value and the counter value fulfilling a preset criterium.

In an embodiment, the at least one memory and computer program code are configured to, with the at least one processor, cause the transmitter further to perform the process as separate sub-processes, one of the sub-processes being a sensing procedure performing the sensing and updating values for the counter and the factor, the other one of the sub-processes being a transmission procedure configured to monitor transit opportunities, to pick the value, to retrieve from the sensing procedure the value of the factor and the counter value, to determine whether to transmit the data, and to restart the sensing procedure in response to the transmission of the data.

In an embodiment, the starting value is zero and/or the factor is a Boolean factor having as the first value true and the second value false and/or the preset criterium is that when the counter value is subtracted from the randomly picked value the result should be equal to or less than zero.

In an embodiment, the randomly picked value is an integer within range of zero to the maximum size of a contention window.

An aspect provides a method comprising: sensing, by an apparatus, whether a channel is busy or idle; setting, by the apparatus, a counter to a starting value; updating, by the apparatus, the counter value during sensing; determining, by the apparatus, in response to data to be transmitted, based on at least the counter value at a transmit opportunity and a duration the channel has been sensed idle before the transmit opportunity, whether to transmit the data or to continue the sensing the channel to a next transit opportunity without resetting the counter value to the starting value; and repeating, by the apparatus, the determining until the data is transmitted.

In an embodiment, the method further comprises: picking, by the apparatus, randomly a value to be used as the starting value in response to the channel being sensed idle a predetermined duration after starting the sensing; decreasing, by the apparatus, as long as the counter value is bigger than a first preset limit, the counter value by one in response to the channel being sensed idle during a sensing duration; decreasing, by the apparatus, the counter value from the first preset limit to a second preset limit in response to both the data to be transmitted existing and a transmit opportunity existing after the sensing duration; and determining, by the apparatus, to transmit the data when the counter value is the second preset limit and the channel has been sensed idle a predetermined defer duration before the transmit opportunity.

In an embodiment, the method further comprises: in response to the channel being been sensed idle a predetermined defer duration after starting the sensing, setting, by the apparatus, the counter value to the starting value and a factor to a first value, which indicates that the channel has been sensed idle the predetermined defer duration; in response to the channel being sensed idle during a sensing duration while the factor has the first value, incrementing, by the apparatus, the counter value by one; in response to the channel being sensed busy during the sensing duration while the factor has the first value, setting, by the apparatus, the factor to a second value and resetting, by the apparatus, the factor to the first value in response to the channel being been sensed idle the predetermined defer duration after setting the factor to the second value; and in response to data to be transmitted and a transit opportunity existing, picking, by the apparatus, randomly a value and determining, by the apparatus, to transmit the data in response to the factor having the first value and the difference between the randomly picked value and the counter value fulfilling a preset criterium.

An aspect provides a computer program comprising instructions for causing an apparatus to perform at least the following: sensing whether a channel is busy or idle; setting a counter to a starting value; updating the counter value during sensing; determining, in response to data to be transmitted, based on at least the counter value at a transmit opportunity and a duration the channel has been sensed idle before the transmit opportunity, whether to transmit the data or to continue the sensing the channel to a next transit opportunity without resetting the counter value to the starting value; and repeating the determining until the data is transmitted.

In an embodiment, the computer program further comprises instructions for causing the apparatus to further perform either a first process or a second process, the first process comprising the following: picking randomly a value to be used as the starting value in response to the channel being sensed idle a predetermined duration after starting the sensing; decreasing, as long as the counter value is bigger than a first preset limit, the counter value by one in response to the channel being sensed idle during a sensing duration; decreasing the counter value from the first preset limit to a second preset limit in response to both the data to be transmitted existing and a transmit opportunity existing after the sensing duration; and determining to transmit the data when the counter value is the second preset limit and the channel has been sensed idle a predetermined defer duration before the transmit opportunity; the second process comprising the following: in response to the channel being been sensed idle a predetermined defer duration after starting the sensing, setting the counter value to the starting value and a factor to a first value, which indicates that the channel has been sensed idle the predetermined defer duration; in response to the channel being sensed idle during a sensing duration while the factor has the first value, incrementing the counter value by one; in response to the channel being sensed busy during the sensing duration while the factor has the first value, setting the factor to a second value and resetting the factor to the first value in response to the channel being been sensed idle the predetermined defer duration after setting the factor to the second value; and in response to data to be transmitted and a transit opportunity existing, picking randomly a value and determining to transmit the data in response to the factor having the first value and the difference between the randomly picked value and the counter value fulfilling a preset criterium.

An aspect provides a computer readable medium comprising program instructions for causing an apparatus to perform at least the following: sensing whether a channel is busy or idle; setting a counter to a starting value; updating the counter value during sensing; determining, in response to data to be transmitted, based on at least the counter value at a transmit opportunity and a duration the channel has been sensed idle before the transmit opportunity, whether to transmit the data or to continue the sensing the channel to a next transit opportunity without resetting the counter value to the starting value; and repeating the determining until the data is transmitted.

In an embodiment, the computer readable medium further comprises program instructions for causing the apparatus to further perform either a first process or a second process, the first process comprising the following: picking randomly a value to be used as the starting value in response to the channel being sensed idle a predetermined duration after starting the sensing; decreasing, as long as the counter value is bigger than a first preset limit, the counter value by one in response to the channel being sensed idle during a sensing duration; decreasing the counter value from the first preset limit to a second preset limit in response to both the data to be transmitted existing and a transmit opportunity existing after the sensing duration; and determining to transmit the data when the counter value is the second preset limit and the channel has been sensed idle a predetermined defer duration before the transmit opportunity; the second process comprising the following: in response to the channel being been sensed idle a predetermined defer duration after starting the sensing, setting the counter value to the starting value and a factor to a first value, which indicates that the channel has been sensed idle the predetermined defer duration; in response to the channel being sensed idle during a sensing duration while the factor has the first value, incrementing the counter value by one; in response to the channel being sensed busy during the sensing duration while the factor has the first value, setting the factor to a second value and resetting the factor to the first value in response to the channel being been sensed idle the predetermined defer duration after setting the factor to the second value; and in response to data to be transmitted and a transit opportunity existing, picking randomly a value and determining to transmit the data in response to the factor having the first value and the difference between the randomly picked value and the counter value fulfilling a preset criterium.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
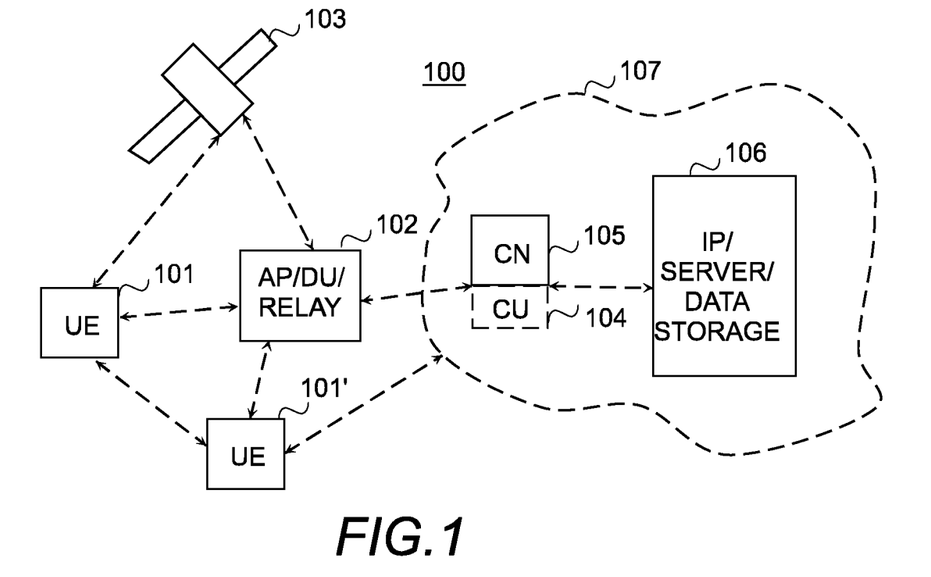
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 6:
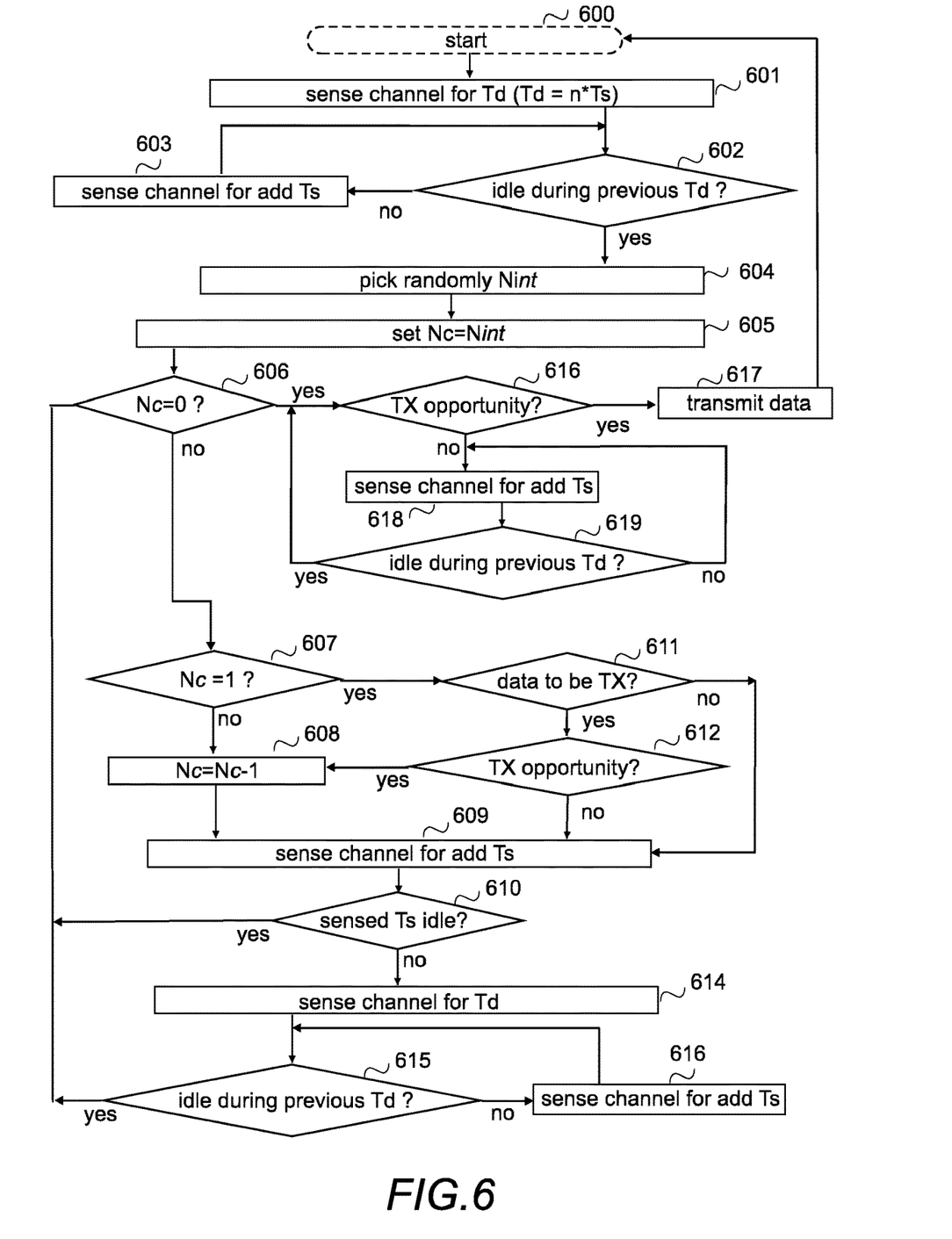
FIG. 6 illustrates an example functionality.
Figure 7:
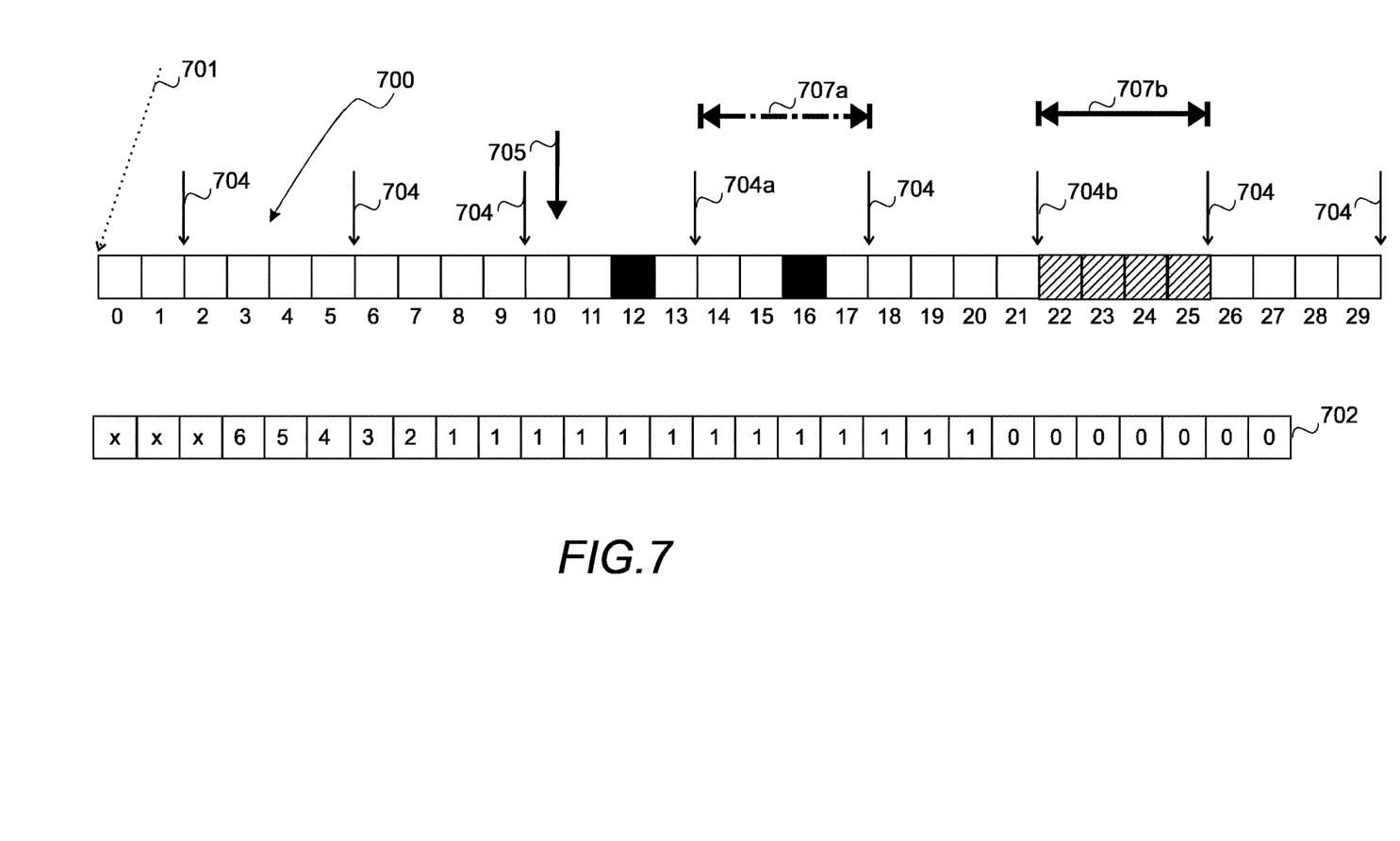
FIG. 7 illustrates an example implementation.

A channel access procedure is a procedure evaluating availability of a channel, or a subchannel, for performing transmissions. Below term "channel" is used for the sake of convenience, to cover also a sub channel. The channel access procedure may be based on sensing the availability of a channel prior to transmission of data. FIGS. 2 to 5 illustrate a channel access procedure in which a sensing procedure and transmission procedure are separate procedures, whereas FIGS. 6 and 7 illustrate a channel access procedure with combined sensing and transmission procedure. The channel access procedures illustrated in FIGS. 2 to 7 are detailed examples of the channel access procedure in FIG. 8.

Figure 2:
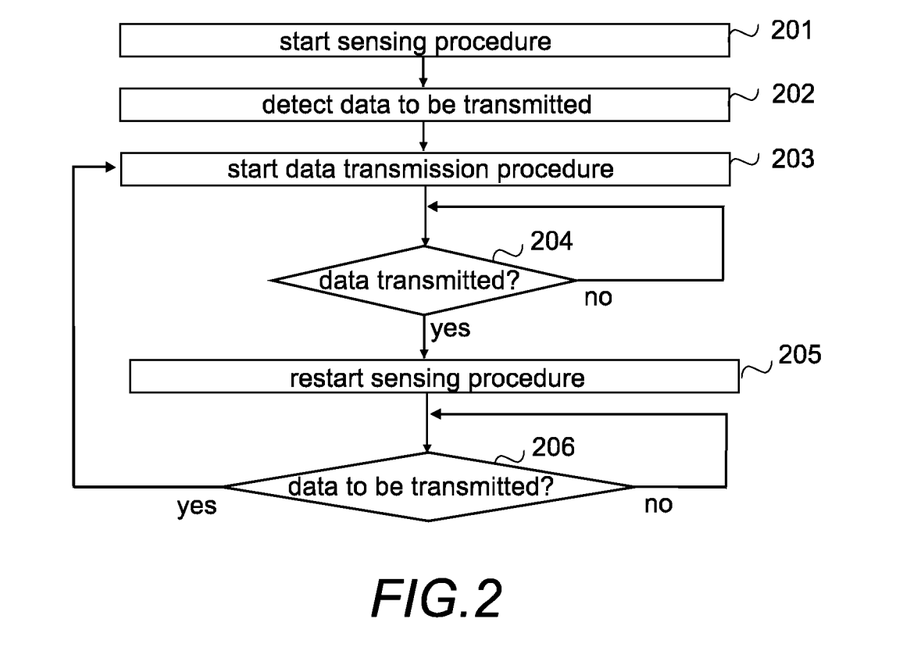
FIGS. 2, 3 and 4 illustrate example functionalities.

Referring to FIG. 2, the sensing procedure is started in block 201 to monitor a channel for busy or idle sensing slots, as will be described in more detail with FIG. 3.

When it is detected in block 202 that there is data to be transmitted, for example the data to be transmitted arrives to a transmission buffer, data transmission procedure is started in block 203. The data transmission procedure is described in more detail with FIG. 4. Even though in the illustrated example the sensing procedure is started before there is data to be transmitted, in another implementation, the sensing procedure may also be started after block 202, i.e. when data to be transmitted arrives to a transmission buffer.

Figure 4:
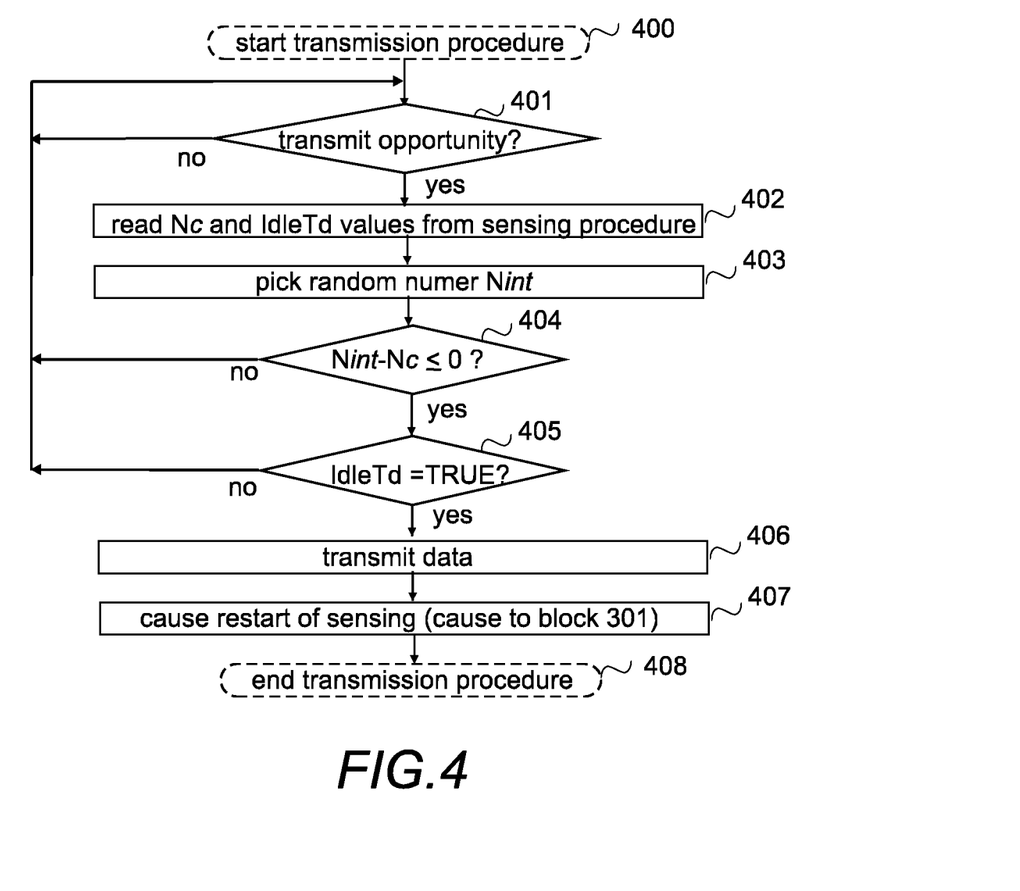

When the data transmission procedure has been started (block 202), it is monitored (block 204: no) until the data has been transmitted (block 204: yes). When the data has been transmitted (block 204: yes), the sensing procedure is restarted in block 205. After that it is monitored (block 206: no) whether there is new data to be transmitted. When there is new data to be transmitted (block 206: yes), the process returns to block 203 to start the data transmission procedure.

In other implementations, in which sensing procedure is started because there is data to be transmitted, the order of blocks 201 and 202 is changed. Depending on an implementation, the restart of sensing procedure (block 205) takes place as in the process of FIG. 2, or after it has been detected that there is data to be transmitted (block 206: yes), i.e. when the data is transmitted (block 204: yes), the process continues to block 206, and if there is data to be transmitted the sensing procedure is restarted (block 205) and the data transmission procedure is started (block 203).

Figure 3:
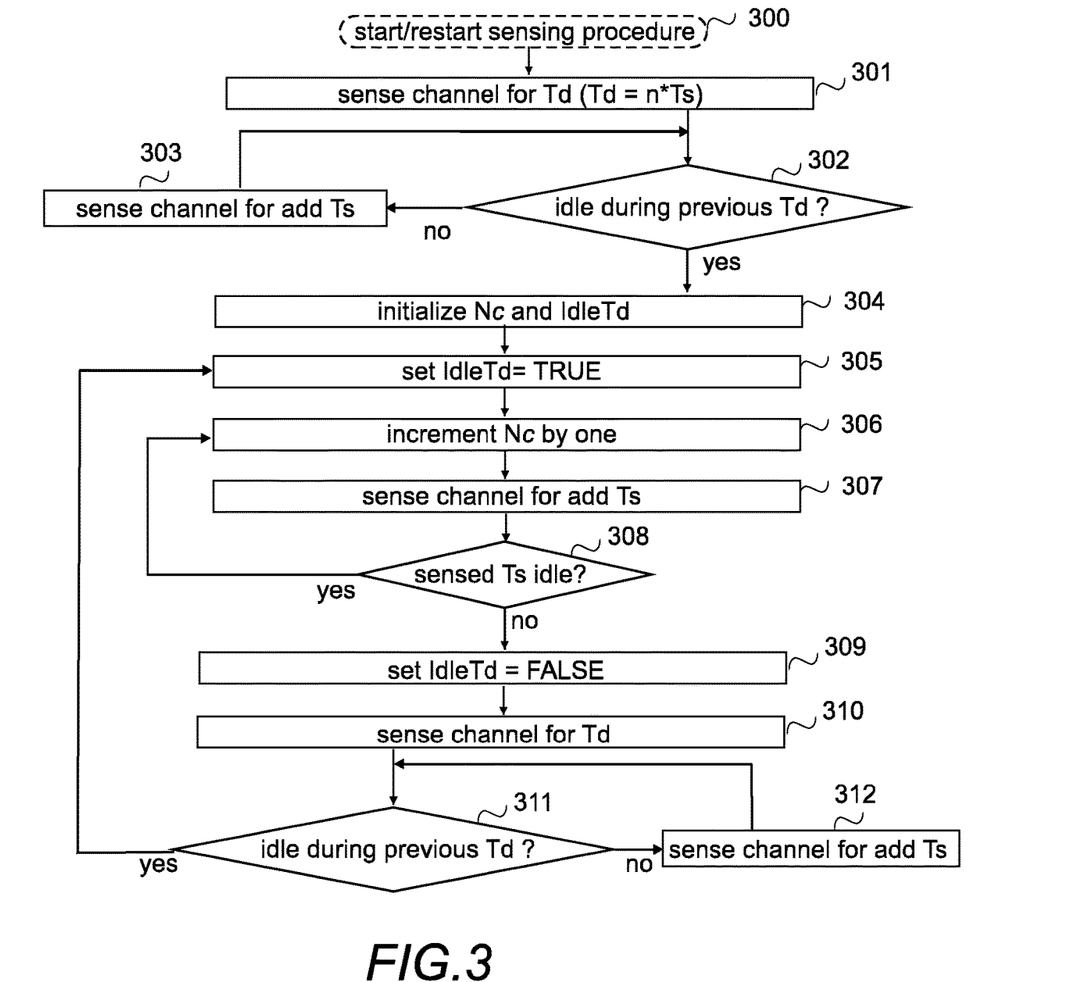

Referring to FIG. 3, when the sensing procedure is started, or restarted (block 300), a channel is sensed in block 301 for a defer duration Td. The defer duration may also be called a defer period. The defer duration is a multiple of a duration of a sensing slot Ts. In other words, the defer duration is a duration of n consecutive sensing slots, where n is a predefined integer number. A sensing slot may be also be called a clear channel assessment slot, CCA slot. The duration of a sensing slot is predefined and it may be 9 µs, n may be 4, resulting to a defer duration of 36 µs, for example. It should be appreciated that any other values may be used.

After the defer duration has passed, it is checked in block 302, whether all sensing slots of the previous, i.e. the just passed defer duration of n consecutive sensing slots, were idle. A sensing slot with a duration of 9 us may be determined to be idle, if during sensing it is determined that a detected power for at least 4 is within the sensing slot duration is less than an energy detection threshold. Otherwise, the sensing slot is considered to be busy. If the previous defer duration, for example one or more of the 4 previous consecutive sensing slots, has not been idle (step 302: no), the channel is sensed in block 303 for a duration of an additional sensing slot Ts, and then the process returns to block 302 to check, whether the previous defer duration has been idle.

If the previous defer duration has been idle (block 302: yes), a counter value Nc and a factor, called herein a Boolean value IdleTd, are initialized in block 304. The Boolean valueThe Boolean value IdleTd is set in block 305 to be "TRUE" (a value indicating that the channel has been sensed idle for the defer duration) and the counter value Nc is incremented in block 306 by one. In the meantime the channel is sensed in block 307 for an additional duration of the sensing slot Ts. If the sensing slot is idle (block 308: yes), the process returns to block 306 to increment the counter value Nc by one and the Boolean value IdleTd remains to be "TRUE".

If the sensing slot is not idle (block 308: no), i.e. it is busy, the Boolean value IdleTd is set to "FALSE" in block 309, the counter value is not changed, and the channel is sensed in block 310 for the defer duration Td while maintaining the counter value and the Boolean value.

After the defer duration has passed, it is checked in block 311, whether all sensing slots of the previous, i.e. just passed defer duration of n consecutive sensing slots, were idle. If the previous defer duration, for example one or more of the 4 previous consecutive sensing slots, has not been idle (step 311: no), the channel is sensed in block 312 for a duration of an additional sensing slot Ts, and then the process returns to block 311 to check, whether the previous defer duration has been idle.

If the previous defer duration has been idle (block 311: yes), the process returns to block 305 to set Boolean value IdleTd to "TRUE" after which the counter value Nc is incremented by one.

In other words, the counter value is (re)set to one (starting value) when the sensing process is started and restarted, otherwise the value remains to same or will be incremented by one, and the Boolean value indicates whether the previous defer duration has been idle.

It is also possible to initialize the counter value Nc and the Boolean value IdleTd when the sensing procedure is started or restarted. In other words, it is possible to perform block 304 before block 301, in which case the counter value Nc will be initialized to 0 and the Boolean value IdleTd to "FALSE". Then only after the channel is sensed idle for the previous defer duration (block 302: yes), the counter value Nc is incremented (block 306) by one and the Boolean value IdleTd is set (block 305) to be "TRUE".

It should be appreciated that any other value may be used as the starting value, and that any other factor with any other value may be used for the purpose to indicate, whether or not the channel has been sensed idle during the previous defer duration.

Referring to FIG. 4, when there is data ready to be transmitted and the transmission procedure is started in block 400, it is waited (block 401: no) until a transmit opportunity takes place (block 401: yes). The transmit opportunity is defined by a higher layer configuration, and transmit opportunities may occur less frequently than once per a sensing slot. For example, for downlink (data from an access node to a user device), the transmit opportunities may be, for example, time locations following a sudden discontinues reception (DRX) pattern agreed with the user device. For uplink, the transmit opportunities may be, for example, time locations of configured grant transmissions, sent by the access node to the user device. In the new radio (NR), which is a synchronous system, typically a transmission opportunity is at the beginning of an OFDM (orthogonal frequency-division multiplexing) symbol. Sometimes a transmission can only start at the beginning of a slot. In the NR, the slot typically comprises 14 OFDM symbols. (The slot can be viewed as the basis for scheduling and it should not be mixed with the sensing slot).

When there is a transmit opportunity (block 401: yes), the transmission procedure reads in block 402 from the sensing procedure current values for the counter value Nc and for the Boolean IdleTd, and picks in block 402 a random number Nint. The random number is a number picked randomly amongst numbers uniformly distributed between 0 to a maximum value of a contention window size $CW_p$.

Then the random number and the counter values are compared to determine whether a preset criterium is fulfilled. More precisely, in the example, it is checked in block 404 whether the random value Nint is smaller than or equal to the counter value Nc. If it is not, i.e. if the remainder of Nint minus Nc is more than zero (block 404: no) the process returns to block 401 to wait for the next transmit opportunity. If the random value Nint is smaller than or equal to the counter value Nc, i.e. the remainder of Nint minus Nc is zero or less than zero (block 404: yes), it is checked in block 405, whether the Boolean IdleTd has a value "TRUE". If it is not (block 405: no) the process returns to block 401 to wait for the next transmit opportunity. It should be appreciated that any other preset criterium may be used as well.

If the Boolean IdleTd has a value "TRUE" (block 405: yes), the data is transmitted in block 406 and restart of the sensing procedure is caused in block 407, i.e. the sensing procedure is caused to continue in block 301. Then the data transmission procedure for that piece of data ends (block 408), and starts again when there is data to be transmitted.

Figure 5:
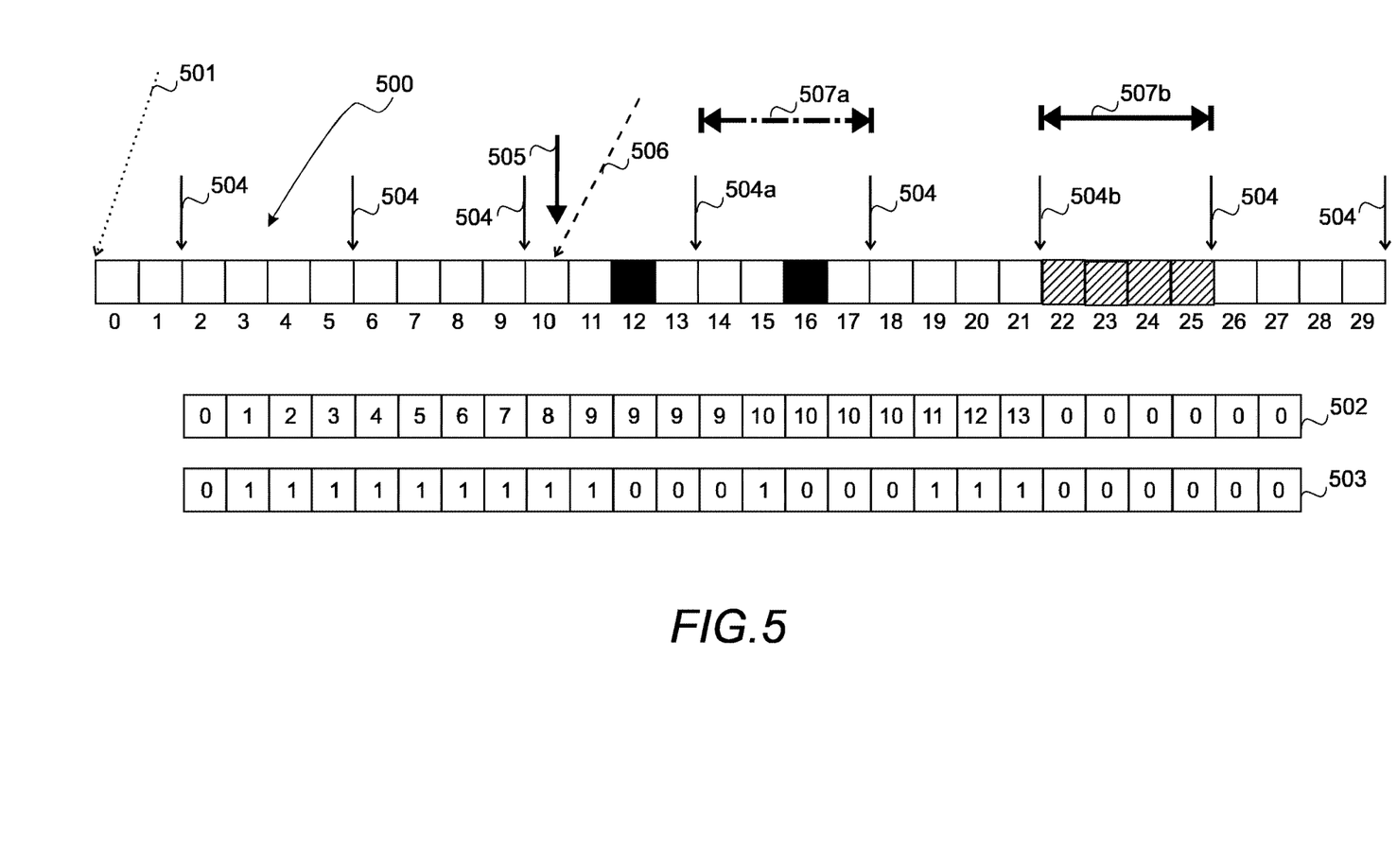
FIG. 5 illustrates an example implementation.

FIG. 5 illustrates an example of how the above described process may be implemented. In the illustrated example it is assumed that the defer duration is the duration of 3 sensing slots. Further, in the example it is assumed, for the sake of clarity, that a transmission period (transmission duration) is as long as an interval between transmission opportunities. It should be appreciated that the transmission period may be longer or shorter than the interval between transmission opportunities. The sensing procedure of a channel 500 is started at 501, wherefrom slot numbering runs continuously, an idle slot being indicated by white, a busy slot by black, and slot for own transmission by hatching. The sensing procedure maintains the counter value Nc 502 and the Boolean value IdleTd 503, wherein value 0 means FALSE and value 1 means TRUE. Transmit opportunities 504 happen in the illustrated example every fourth sensing slot. After the starts of the sensing procedure, there is no transmissions, i.e. the channel and slots are idle, the loop of blocks 306, 307 and 308:yes in FIG. 3 is repeated after the defer period (slots 0 to 2), until slot 12 is detected to be busy. Therefore the IdleTd 503 is set 0 and the counter 502 is not incremented, and the sensing procedure repeats the loop of blocks 309 to 311 in FIG. 3 until a defer period with all slots idle is detected.

When there is data 505 ready to be transmitted, the transmission procedure starts at 506. At the next transmit opportunity 504a, as described with FIG. 4, the counter value and the Boolean value at slot 13 are retrieved (Nc=9, IdleTd=0, i.e. FALSE), and a random number Nint is picked. Let us assume that the random number is 6. Since Nint-Nc (6−9=−3) is smaller than zero, the Boolean value IdleTd is checked. Since the Boolean value is FALSE, the transmission procedure returns to monitor next transmit opportunity after the end of the first possible transmission period 507a. At the next transmit opportunity 504b, the counter value and the Boolean value at slot 21 are retrieved (Nc=12, IdleTd=1, i.e. TRUE), and a random number Nint is picked. Let us assume that the random number is 4. Since Nint−Nc (4−12=−9) is smaller than zero, the Boolean value IdleTd is checked. Since the Boolean value is TRUE, the data is transmitted at the second possible transmission period 507b. In the illustrated example, the start of the transmission also causes restart of the sensing procedure at beginning of slot 22, which is reflected to the counter value 502 and to the Boolean value 503. In other words, at 504b the first sensing period ends. and the second sensing period starts, with counter value zero and the Boolean value FALSE. However, in another example the second sensing period starts after the data has been transmitted, In a further example, the second sensing period starts after the data has been transmitted, or after the transmission period 507b, whichever occurs later.

In the implementation disclosed with FIGS. 2 to 5, the counter calculates the total number of idle slots after from the beginning of the sensing period. So the longer the sensing period before there is a transmission opportunity, the greater is the likelihood that the picked random number is smaller than the value of the counter, thereby shortening the time when the actual transmission may happen, if no other device transmits.

Referring to FIG. 6, when the channels access procedure is started (block 600), a channel is sensed in block 601 for the defer duration Td, in the same way as described above with block 301 of FIG. 3.

After the defer duration has passed, it is checked in block 602, whether all sensing slots of the previous, i.e. just passed defer duration of n consecutive sensing slots, were idle, in the same way as described above with block 302 of FIG. 3. If the previous defer duration, for example one or more of the 4 previous consecutive sensing slots, has not been idle (step 602: no), the channel is sensed in block 603 for a duration of an additional sensing slot Ts, and then the process returns to block 602 to check, whether the previous defer duration has been idle.

If the previous defer duration has been idle (block 602: yes), a number Nint is picked randomly in block 604, as described above with block 402 of FIG. 4. However, in the implementation the randomly picked number (random number) is used as the starting value of the counter. Then a counter value Nc (a backoff counter value) is set in block 605 to have the picked random number value Nint.

Then it is checked, in block 606, whether the counter value Nc is zero. If not (block 606:no), it is checked in block 607, whether the counter value Nc is one. If not, the counter value Nc is decreased in block 608 by one, and the channel is sensed in block 609 for an additional duration of the sensing slot Ts. If the sensing slot is idle (block 610: yes), the process returns to block 606 to check, whether the counter value Nc is zero.

If the counter value Nc is one (block 607: yes), it is checked in block 611 whether there is data to be transmitted, for example whether there is in a transmission buffer data ready to be transmitted. If not (block 611: no), the process continues to block 609 to sense the channel for an additional duration of the sensing slot Ts.

If there is data to be transmitted (block 611:yes), it is checked in block 612, whether there is a transmit opportunity starting after the next sensing slot. If not (block 612: no), the process continues to block 609 to sense the channel for an additional duration of the sensing slot Ts.

If there is a transmit opportunity (block 612: yes) starting after the next sensing slot, the process proceeds to block 608 to decrease the counter value Nc by one. This time the counter value Nc is after block 608 zero. In other words, the counter value Nc will be zero only when there is data to be sent and at a transmit opportunity.

If the sensing slot is not idle (block 610: no), i.e. it is busy, the channel is sensed in block 613 for the defer duration Td.

After the defer duration Td has passed, it is checked in block 614, whether all sensing slots of the previous, i.e. just passed defer duration of n consecutive sensing slots, were idle. If the previous defer duration, for example one or more of the 4 previous consecutive sensing slots, has not been idle (step 614: no), the channel is sensed in block 616 for a duration of an additional sensing slot Ts, and then the process returns to block 614 to check, whether the previous defer duration has been idle.

If the previous defer duration has been idle (block 614: yes), the process returns to block 606 to check, whether the counter value Nc is zero.

When the counter value Nc is zero (block 606: yes), it is checked in block 616, whether there is a transmit opportunity starting. The additional check is performed here in case the counter value check in block 606 is performed after block 615. This may happen at any time, not necessarily at the time of a transmit opportunity. If the counter value check in block 606 is performed after block 610, the check is in principle void, because of the check in block 612, and hence could be omitted.

If there is a transmit opportunity (block 616: yes) starting, data transmission is caused in block 617, and then the process starts again (i.e. goes to block 600).

If not (block 616: no), the process continues to block 618 to sense the channel for an additional duration of the sensing slot Ts, and then it is checked in block 619, whether all sensing slots of the previous, i.e. just passed defer duration of n consecutive sensing slots, were idle. If the previous defer duration, for example one or more of the 4 previous consecutive sensing slots, has not been idle (step 619: no), the process returns to block 618 to sense the channel for an additional duration of the sending slot Ts.

If the previous defer duration, for example one or more of the 4 previous consecutive sensing slots, has been idle (step 619: yes), the process returns to block 616 to check whether there is a transmit opportunity.

In other words, even if after the counter has reached zero and a transmit opportunity is missed because of the channel not being idle, the process is not started again but sensing is continued until there is the first transmit opportunity before which the channel has been idle during the defer duration.

It should be appreciated that instead of the preset limits of zero and one, any other preset limits may be used in blocks 606 and 607, with the limitations that the limit in block 607 has to be bigger than the preset limit in block 606.

FIG. 7 illustrates an example of how the above described process of FIG. 6 may be implemented. The channel access procedure of a channel 700 is started at 701, wherefrom slot numbering runs continuously, an idle slot being indicated by white, a busy slot by black, and slot for own transmission by hatching. In the illustrated example, during the defer period (blocks 601, 602 in FIG. 6), all sensed slot have been idle, and therefore at slot 3 a random number Nint is picked and set to be the counter values 702. Let us assume that the random number is 6. Then in the illustrated example, the loop of blocks 606 to 610 are performed until slot number 8 in which the counter value reaches value 1 after which it is not any more decreased. Then the loop of blocks 606:no, 607:yes, 611:no, 609 and 610:yes in FIG. 6 is repeated until in the illustrated example there is data 705 ready to be transmitted at slot 10. Then the loop of blocks 606:no, 607:yes, 611:yes, 612:no, 609 and 610:yes in FIG. 6 is repeated until slot 12 is detected to be busy. Therefore the process loops in blocks 614 to 616, and misses the first transmit opportunity 705a and the first possible transmission period 707a, until in block 20 it returns back to block 606. However, in this time, after blocks 606:no, 607:yes, 611:yes, it is detected that after the next slot there will be a transmit opportunity 705b, and the counter value is decreased to zero, block 21 is sensed to be idle, causing the data to be sent in the second possible transmission period 707b. Then the channel access procedure starts again from the beginning, i.e. from block 600 in FIG. 6.

Both examples of FIGS. 5 and 7 provide a reduction in time it take to transmit data when compared with a solution in which the busy slot 12 would cause that at slot 14 a sensing procedure would be started from the beginning (because of the channel not being idle long enough before the transmission opportunity). Such a procedure, for example a listen before transmit (LBT) procedure CAT4 LBT, may be similar to the one described with FIG. 6, with the exception that the counter value is decreased until it is zero (i.e. no blocks 607, 611 and 612), and after the counter value is zero, when there is data to be sent and there is a transmit opportunity, it is checked, whether the channel has been idle during the defer duration, and if it is, the process transmits the data, otherwise it starts again, including resetting the counter value to a starting value. Assuming that at slot 14 the process starts again, and the picked random number Nint for the counter would be 6, then the data would be sent at slot 30 (not illustrated in FIGS. 5 and 7). For example, 3GPP specification TS 37.213 V16.1.0, March 2020, describes in section 4.1.1 such a procedure for downlink and in section 4.2.1.1 for uplink, the procedure being called Type1 LBT. Since the sizes given for the contention window in said 3GPP specification are from 3 up to 1023, the solutions described herein may save quite a lot of time.

Figure 8:
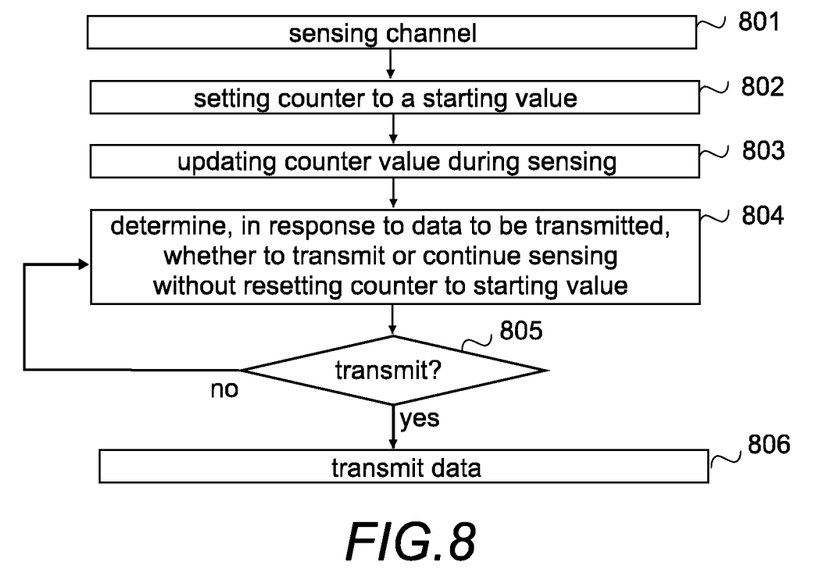
FIG. 8 illustrates an example functionality.

The above disclosed channel access procedures are detailed examples of a channel access procedure in which a missed transmit opportunity does not cause restarting the process, or processes from the beginning, the basic principles of such a listen before transmit channel access procedure being illustrated in the example of FIG. 8.

Referring to FIG. 8, listen before transmit channel access procedure comprises sensing (block 801), whether a channel is busy or idle, setting (block 802) a counter, also called a backoff counter, to a starting value ($N_c$=starting value), updating (block 803) the counter value during sensing, determining (block 804), in response to data to be transmitted, based on at least the counter value at a transmit opportunity and a duration the channel has been sensed idle before the transmit opportunity, whether (block 805) to transmit the data or to continue the sensing the channel to a next transit opportunity without resetting the counter value to the starting value; and repeating (block 805: no) the determining until (block 805: yes) the data is transmitted (block 806).

The updating the counter value in block 803 may be based on at least one of sensing, the counter value, data availability in the transmission buffer, and availability of a transmit opportunity. The updating in block 803 may include either increasing the counter value in response to a first criteria being met, for example as described with FIG. 3, or by decreasing the counter value to a first preset limit in response to a second criteria being met and from the first preset limit to a second preset limit in response to a third criteria being met, as explained with FIG. 6, in which the first preset limit is one, the second preset limit is zero, and the second criteria is that the counter value is one, there is data to be transmitted and there is a transmit opportunity.

The blocks, and related functions described above by means of FIGS. 2 to 8 are in no absolute chronological order, and some of them may be performed simultaneously or in an order differing from the given one. Other functions can also be executed between them or within them, and/or other rules applied or selected. Some of the blocks or part of the blocks or one or more pieces of information can also be left out or replaced by a corresponding block or part of the block or one or more pieces of information.

Figure 9:
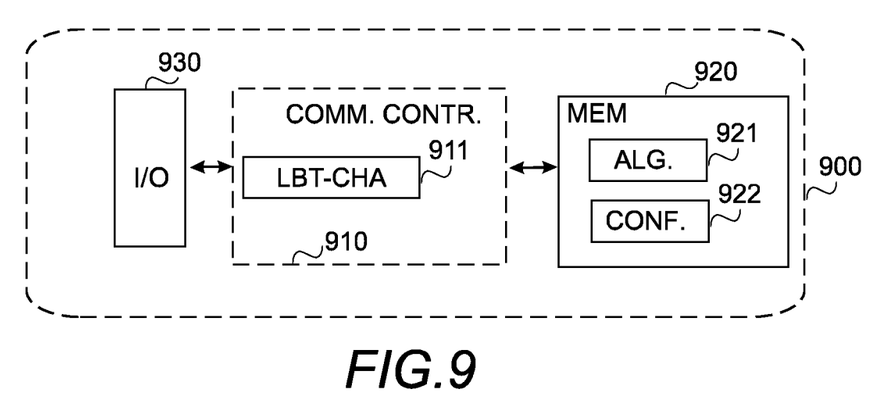
FIG. 9 is a schematic block diagram.

FIG. 9 illustrates an apparatus comprising a communication controller 910 such as at least one processor or processing circuitry, and at least one memory 920 including a computer program code (software, algorithm) ALG. 921, wherein the at least one memory and the computer program code (software, algorithm) are configured, with the at least one processor, to cause the respective apparatus to carry out any one of the embodiments, examples and implementations described above. The apparatus of FIG. 9 may be an electronic device, for example a transmitter for a user device or for an access node/base station/gNB.

Referring to FIG. 9, the memory 920 may be implemented using any suitable data storage technology, such as semiconductor based memory devices, flash memory, magnetic memory devices and systems, optical memory devices and systems, fixed memory and removable memory. The memory may comprise a configuration storage CONF. 922, such as a configuration database, for at least storing one or more configurations and/or corresponding parameters/parameter values, for example the criteria to use for decision (s), or the counter value, or number of sensed consecutive idle slots. The memory 920 may further store a data buffer for uplink data waiting for transmission and/or downlink data waiting to be decoded.

Referring to FIG. 9, the apparatus 900 may further comprise a communication interface 930 comprising hardware and/or software for realizing communication connectivity according to one or more radio communication protocols. The communication interface 930 may provide the apparatus with radio communication capabilities with one or more base stations (access nodes) of a wireless network. The communication interface may comprise standard well-known components such as an amplifier, filter, frequency-converter, (de)modulator, and encoder/decoder circuitries and one or more antennas. Digital signal processing regarding transmission and/or reception of signals may be performed in a communication controller 910. In an embodiment, the communication interface may comprise one or more antenna arrays providing the apparatus with capability of forming directive transmission radio beams and the reception radio beams.

The communication controller 910 may comprise one or more listen before transmit channel access units (LBT-CHA) 911 configured to perform the channel access procedure according to any one of the embodiments/examples/implementations described above.

The apparatus 900 may further comprise an application processor (not illustrated in FIG. 9) executing one or more computer program applications that generate a need to transmit and/or receive data The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile device or a similar integrated circuit in a sensor, a cellular network device, or another network device.

In an embodiment, at least some of the processes described in connection with FIGS. 2 to 8 may be carried out by an apparatus comprising corresponding means for carrying out at least some of the described processes. The apparatus may comprise separate means for separate phases of a process, or means may perform several phases of the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out any of the embodiments comprises a circuitry including at least one processor and at least one memory including computer program code. When activated, the circuitry causes the apparatus to perform at least some of the functionalities according to any one of the embodiments/examples/implementations of FIGS. 2 to 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art.

Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program. For example, the non-transitory medium may be a non-transitory computer readable medium comprising program instructions for causing an apparatus to perform at least the following: sensing whether a channel is busy or idle, setting a counter to a starting value, updating the counter value during sensing, determining, in response to data to be transmitted, based on at least the counter value at a transmit opportunity and a duration the channel has been sensed idle before the transmit opportunity, whether to transmit the data or to continue the sensing the channel to a next transit opportunity without resetting the counter value to the starting value, and repeating the determining until the data is transmitted.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A transmitter comprising
at least one processor; and
at least one memory including computer program code, the at least one memory and computer program code configured to, with the at least one processor, cause the transmitter at least to perform:
sensing whether a channel is busy or idle;
setting a counter to a starting value;
updating the counter value during sensing;
determining, in response to there being data to be transmitted, based on at least the counter value at one of a plurality of defined transmit opportunities and a duration for which the channel has been sensed idle before the one transmit opportunity, whether to transmit the data or to continue the sensing of the channel to a next transmit opportunity without resetting the counter value to the starting value; and
repeating the determining until the data is transmitted.

2. A transmitter according to claim 1, wherein the at least one memory and computer program code configured to, with the at least one processor, cause the transmitter further to perform:
restarting the sensing and resetting the counter after transmitting the data.

3. A transmitter according to claim 1, wherein the at least one memory and computer program code configured to, with the at least one processor, cause the transmitter further to perform:
picking randomly a value to be used as the starting value in response to the channel being sensed idle a predetermined duration after starting the sensing;
decreasing, as long as the counter value is bigger than a first preset limit, the counter value by one in response to the channel being sensed idle during a sensing duration;
decreasing the counter value from the first preset limit to a second preset limit in response to both the data to be transmitted existing and the next transmit opportunity existing after the sensing duration; and
determining to transmit the data when the counter value is the second preset limit and the channel has been sensed idle a predetermined defer duration before the next transmit opportunity.

4. A transmitter according to claim 3, wherein the first preset limit is one and the second preset limit is zero.

5. A transmitter comprising
at least one processor; and
at least one memory including computer program code, the at least one memory and computer program code configured to, with the at least one processor, cause the transmitter at least to perform:
sensing whether a channel is busy or idle;
setting a counter to a starting value;
updating the counter value during sensing;
determining, in response to there being data to be transmitted, based on at least the counter value at a transmit opportunity and a duration for which the channel has been sensed idle before the transmit opportunity, whether to transmit the data or to continue the sensing of the channel to a next transmit opportunity without resetting the counter value to the starting value;
repeating the determining until the data is transmitted;
in response to the channel being sensed idle a predetermined defer duration after starting the sensing, setting the counter value to the starting value and a factor to a first value, which indicates that the channel has been sensed idle the predetermined defer duration;
in response to the channel being sensed idle during a sensing duration while the factor has the first value, incrementing the counter value by one;
in response to the channel being sensed busy during the sensing duration while the factor has the first value, setting the factor to a second value and resetting the factor to the first value in response to the channel being sensed idle the predetermined defer duration after setting the factor to the second value; and
in response to data to be transmitted and a transmit opportunity existing, picking randomly a value and determining to transmit the data in response to the factor having the first value and the difference between the randomly picked value and the counter value fulfilling a preset criterion.

6. A transmitter according to claim 5, wherein the at least one memory and computer program code configured to, with the at least one processor, cause the transmitter further to perform the process as separate sub-processes, one of the subprocesses being a sensing procedure performing the sensing and updating values for the counter and the factor, the other one of the sub-processes being a transmission procedure configured to monitor transmit opportunities, to pick the value, to retrieve from the sensing procedure the value of the factor and the counter value, to determine whether to transmit the data, and to restart the sensing procedure in response to the transmission of the data.

7. A transmitter according to claim 5, wherein the starting value is zero and/or the factor is a Boolean factor having as the first value true and the second value false and/or the preset criterium is that when the counter value is subtracted from the randomly picked value the result should be equal to or less than zero.

8. A transmitter according to claim 3, wherein the randomly picked value is an integer within range of zero to the maximum size of a contention window.

9. A method comprising:
sensing, by an apparatus, whether a channel is busy or idle;
setting, by the apparatus, a counter to a starting value;
updating, by the apparatus, the counter value during sensing;
determining, by the apparatus, in response to there being data to be transmitted, based on at least the counter value at one of a plurality of defined transmit opportunities and a duration for which the channel has been sensed idle before the one transmit opportunity, whether to transmit the data or to continue the sensing of the channel to a next transmit opportunity without resetting the counter value to the starting value; and
repeating, by the apparatus, the determining until the data is transmitted.

10. A method according to claim 9, further comprising:
picking, by the apparatus, randomly a value to be used as the starting value in response to the channel being sensed idle a predetermined duration after starting the sensing;
decreasing, by the apparatus, as long as the counter value is bigger than a first preset limit, the counter value by one in response to the channel being sensed idle during a sensing duration;
decreasing, by the apparatus, the counter value from the first preset limit to a second preset limit in response to both the data to be transmitted existing and the next transmit opportunity existing after the sensing duration; and
determining, by the apparatus, to transmit the data when the counter value is the second preset limit and the channel has been sensed idle a predetermined defer duration before the next transmit opportunity.

11. A method comprising:
sensing, by an apparatus, whether a channel is busy or idle;
setting, by the apparatus, a counter to a starting value;
updating, by the apparatus, the counter value during sensing;
determining, by the apparatus, in response to there being data to be transmitted, based on at least the counter value at a transmit opportunity and a duration for which the channel has been sensed idle before the transmit opportunity, whether to transmit the data or to continue the sensing of the channel to a next transmit opportunity without resetting the counter value to the starting value;
repeating, by the apparatus, the determining until the data is transmitted;
in response to the channel being sensed idle a predetermined defer duration after starting the sensing, setting, by the apparatus, the counter value to the starting value and a factor to a first value, which indicates that the channel has been sensed idle the predetermined defer duration;
in response to the channel being sensed idle during a sensing duration while the factor has the first value, incrementing, by the apparatus, the counter value by one;
in response to the channel being sensed busy during the sensing duration while the factor has the first value, setting, by the apparatus, the factor to a second value and resetting, by the apparatus, the factor to the first value in response to the channel being sensed idle the predetermined defer duration after setting the factor to the second value; and
in response to data to be transmitted and a transmit opportunity existing, picking, by the apparatus, randomly a value and determining, by the apparatus, to transmit the data in response to the factor having the first value and the difference between the randomly picked value and the counter value fulfilling a preset criterion.

12. A non-transitory computer readable medium comprising program instructions for causing an apparatus to perform at least the following:
sensing whether a channel is busy or idle;
setting a counter to a starting value;
updating the counter value during sensing;
determining, in response to there being data to be transmitted, based on at least the counter value at one of a plurality of defined transmit opportunities and a duration for which the channel has been sensed idle before the one transmit opportunity, whether to transmit the data or to continue the sensing of the channel to a next transmit opportunity without resetting the counter value to the starting value; and
repeating the determining until the data is transmitted.

13. A non-transitory computer readable medium according to claim 12, further comprising program instructions for causing the apparatus to further perform either a first process or a second process,
the first process comprising the following:
picking randomly a value to be used as the starting value in response to the channel being sensed idle a predetermined duration after starting the sensing;
decreasing, as long as the counter value is bigger than a first preset limit, the counter value by one in response to the channel being sensed idle during a sensing duration;
decreasing the counter value from the first preset limit to a second preset limit in response to both the data to be transmitted existing and the next transmit opportunity existing after the sensing duration; and
determining to transmit the data when the counter value is the second preset limit and the channel has been sensed idle a predetermined defer duration before the next transmit opportunity;

the second process comprising the following:
in response to the channel being sensed idle a predetermined defer duration after starting the sensing, setting the counter value to the starting value and a factor to a first value, which indicates that the channel has been sensed idle the predetermined defer duration;
in response to the channel being sensed idle during a sensing duration while the factor has the first value, incrementing the counter value by one;
in response to the channel being sensed busy during the sensing duration while the factor has the first value, setting the factor to a second value and resetting the factor to the first value in response to the channel being sensed idle the predetermined defer duration after setting the factor to the second value; and
in response to data to be transmitted and a transmit opportunity existing, picking randomly a value and determining to transmit the data in response to the factor having the first value and the difference between the randomly picked value and the counter value fulfilling a preset criterion.

* * * * *